United States Patent
Mashiko et al.

(10) Patent No.: US 12,162,422 B2
(45) Date of Patent: Dec. 10, 2024

(54) OCCUPANT PROTECTION DEVICE

(71) Applicant: SUBARU CORPORATION, Tokyo (JP)

(72) Inventors: Koichi Mashiko, Tokyo (JP); Takehiro Kurihara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/514,621

(22) Filed: Nov. 20, 2023

(65) Prior Publication Data
US 2024/0190379 A1 Jun. 13, 2024

(51) Int. Cl.
B60R 21/2338 (2011.01)
B60R 21/00 (2006.01)
B60R 21/01 (2006.01)

(52) U.S. Cl.
CPC .. B60R 21/2338 (2013.01); *B60R 2021/0048* (2013.01); *B60R 2021/01286* (2013.01); *B60R 2021/23384* (2013.01)

(58) Field of Classification Search
CPC .... B60R 2021/0009; B60R 2021/0023; B60R 2021/0048; B60R 2021/23107; B60R 2021/23308; B60R 2021/23382; B60R 2021/23384; B60R 2021/23386; B60R 2021/23388; B60R 21/205; B60R 21/213; B60R 21/232; B60R 21/233; B60R 21/2338
See application file for complete search history.

(56) References Cited

U.S. PATENT DOCUMENTS

| | | | |
|---|---|---|---|
| 8,322,748 B2 * | 12/2012 | Abe | B60R 21/2338 |
| | | | 280/739 |
| 9,248,799 B2 * | 2/2016 | Schneider | B60R 21/233 |
| 9,296,360 B2 * | 3/2016 | Komamura | B60R 21/276 |
| 9,446,735 B1 * | 9/2016 | Jayasuriya | B60R 21/231 |
| 9,463,763 B2 * | 10/2016 | Watamori | B60R 21/23138 |
| 9,676,355 B2 * | 6/2017 | Kruse | B60R 21/233 |
| 9,738,244 B2 * | 8/2017 | Lee | B60R 21/2338 |

(Continued)

FOREIGN PATENT DOCUMENTS

| | | | |
|---|---|---|---|
| JP | 2010201980 A | * | 9/2010 |
| JP | 2016037131 A | * | 3/2016 |

(Continued)

*Primary Examiner* — Laura Freedman
(74) *Attorney, Agent, or Firm* — MCGINN I.P. LAW GROUP, PLLC

(57) ABSTRACT

An occupant protection device for a vehicle includes a first bag, a second bag, and a deployment controller. The first bag deploys in front of an occupant of the vehicle. The second bag deploys adjacent to the first bag. The deployment controller selects a first deployment mode in which the first bag deploys or the second bag does not deploy and a second deployment mode in which the first bag and the second bag deploy according to a collision mode. The first bag includes a first air chamber and a second air chamber protruding from the first air chamber toward the second bag. The occupant protection device further includes a deployment restriction member that restricts an amount of protrusion of the second air chamber from the first air chamber. The deployment restriction member is disabled in the first deployment mode and enabled in the second deployment mode.

8 Claims, 5 Drawing Sheets

(56) References Cited

U.S. PATENT DOCUMENTS

| | | | |
|---|---|---|---|
| 10,023,144 B2* | 7/2018 | Taguchi | B60R 21/2338 |
| 10,293,775 B2* | 5/2019 | Wang | B60R 21/205 |
| 10,322,693 B2* | 6/2019 | Yoo | B60R 21/203 |
| 10,328,884 B2* | 6/2019 | Kobayashi | B60R 21/231 |
| 10,661,746 B2* | 5/2020 | Yamada | B60R 21/216 |
| 10,730,472 B2* | 8/2020 | Perez | B60R 21/233 |
| 10,814,822 B2* | 10/2020 | Kanegae | B60R 21/233 |
| 10,821,932 B2* | 11/2020 | Kanegae | B60R 21/233 |
| 10,926,734 B2* | 2/2021 | Yamada | B60R 21/233 |
| 11,203,320 B2* | 12/2021 | Yamada | B60R 21/23138 |
| 2016/0107602 A1 | 4/2016 | Nakashima | |
| 2020/0079315 A1 | 3/2020 | Hioda | |
| 2024/0190378 A1* | 6/2024 | Mashiko | B60R 21/2334 |

FOREIGN PATENT DOCUMENTS

| | | | |
|---|---|---|---|
| JP | 2016037133 A | * | 3/2016 |
| JP | 2018079709 A | * | 5/2018 |
| JP | 2019-182372 A | | 10/2019 |
| JP | 2020-040585 A | | 3/2020 |
| WO | WO 2014-188922 A1 | | 11/2014 |

* cited by examiner

OCCUPANT PROTECTION DEVICE

CROSS-REFERENCE TO RELATED APPLICATIONS

The present application claims priority from Japanese Patent Application No. 2022-198412 filed on Dec. 13, 2022, the entire contents of which are hereby incorporated by reference.

BACKGROUND

The present disclosure relates to an occupant protection device provided in a vehicle.

As a technology related to an airbag device that is provided in a vehicle such as an automobile and restrains an occupant in the event of a collision, for example, International Patent Application Publication WO 2014-188922 A1 discloses a vehicle curtain airbag device that does not interfere with an airbag in a driver's seat or a passenger seat and is capable of appropriately exhibiting occupant protection performance even in a normal collision mode or a small overlap mode, the vehicle curtain airbag device including a main chamber whose front end is expandable and inflatable in the vicinity of a front pillar, and an additional chamber that is provided in front of the main chamber and is separated from the main chamber by a partition part set between the front pillar and an expansion region of the airbag in the driver's seat and is expandable and inflatable. Further, it is also described that a strap is provided in front of the main chamber, the strap having a front end coupled to the front pillar at a first attachment point for applying tension to the main chamber during deployment of the main chamber.

Japanese Unexamined Patent Application Publication No. 2019-182372 discloses a vehicle occupant protection device including a curtain airbag inflated and deploy in a curtain shape on a side of an airbag for a passenger seat, in which a hook-and-loop fastener as a coupling means is provided in a region including a region on a front side in a vehicle front-rear direction in a contact portion between the airbag for the passenger seat in an inflated and deployed state and the curtain airbag. Further, it is described that one component of the hook-and-loop fastener is fixed to the airbag for the passenger seat, and the other component of the hook-and-loop fastener is fixed to the curtain airbag.

Japanese Unexamined Patent Application Publication No. JP 2020-040585 describes that a tether that draws a first side wall of an airbag for a passenger seat inward in a vehicle width direction when the airbag for the passenger seat is inflated and deployed is attached to a vehicle rear side of a vent hole in the first side wall. In addition, it is described that one end of a strap-shaped tension belt is attached to a front end of a curtain airbag, and the other end of the tension belt is fixed to a front pillar with a fixing bolt.

SUMMARY

An aspect of the disclosure provides an occupant protection device for a vehicle. The occupant protection device includes a first bag, a second bag, and a deployment controller. The first bag is configured to deploy in front of an occupant of the vehicle. The second bag is configured to deploy adjacent to the first bag. The deployment controller is configured to select a first deployment mode in which the first bag deploys and the second bag does not deploy and a second deployment mode in which the first bag or the second bag deploy according to a collision mode. The first bag includes a first air chamber and a second air chamber protruding from the first air chamber toward the second bag. The occupant protection device further includes a deployment restriction member configured to restrict an amount of protrusion of the second air chamber from the first air chamber. The deployment restriction member is configured to be disabled in the first deployment mode and enabled in the second deployment mode.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

For example, in a case of a collision mode in which a lateral behavior occurs in the vehicle body, such as an offset collision or an oblique frontal collision (oblique collision), there is a possibility that the occupant is displaced from the airbag deployed on the front side of the occupant and collides with the airbag, and thus, for example, in an airbag in a passenger seat airbag or the like, it has been proposed to provide protrusions (side support portions) that sandwich the head or the upper body of the occupant from the left and right so that the occupant is not displaced.

On the other hand, in the collision mode in which a lateral behavior occurs in the vehicle body, the head of the occupant can be effectively protected by deploying a curtain airbag in a region adjacent to the cabin side surface portion.

However, when a frontal collision airbag and a curtain airbag or the like deployed around the frontal collision airbag interfere with each other at the time of deployment, deformation and positional displacement of each airbag occur, and there is a concern that occupant protection performance is deteriorated.

In view of the above-described problems, it is desirable to provide an occupant protection device in which interference between bags is suppressed and occupant protection performance is improved.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Hereinafter, a first embodiment of an occupant protection device to which the present disclosure is applied will be described.

An occupant protection device according to the first embodiment is an airbag device provided in a cabin of an automobile such as a passenger car, for example.

Note that each bag is actually deploy not by air but by a deployment gas generated by a chemical (gunpowder) inflator (gas generator), but will be hereinafter described as an "airbag" which is a general name.

Figure 1:
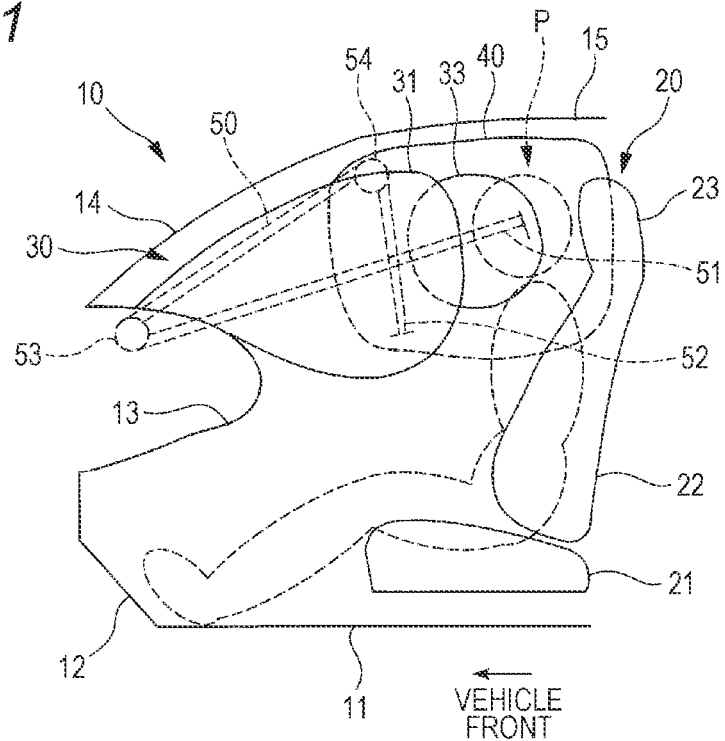
FIG. 1 is a schematic side view of a cabin of a vehicle including an embodiment of an occupant protection device to which the present disclosure is applied.

FIG. 1 is a schematic side view of a cabin of a vehicle including an occupant protection device according to the first embodiment.

The cabin 10 includes a floor panel 11, a toe board 12, an instrument panel 13, a windshield 14, a roof 15, and the like.

The floor panel 11 is a floor surface of the cabin 10 and is a flat plate-like part disposed substantially horizontally.

The toe board 12 is a part formed by rising upward from a front end of the floor panel 11.

The toe board 12 is disposed on the front side of the foot of the occupant P.

The instrument panel 13 is an interior member formed to protrude from an upper part of the toe board 12 to the vehicle rear side (cabin side).

The instrument panel 13 houses instruments, an air conditioning ventilator, an infotainment device, and the like (not illustrated).

Further, the instrument panel 13 serves as a base to which a passenger seat airbag 30 described later is attached.

The windshield 14 is a glass provided on a front window through which the occupant P visually recognizes the front side of the vehicle.

The windshield 14 extends upward and obliquely rearward from an upper end (front end) of the instrument panel 13.

The roof 15 is a panel-shaped member constituting an upper surface part (ceiling part) of the cabin 10.

The roof 15 extends from an upper end of the windshield 14 toward the vehicle rear side.

The floor panel 11, the toe board 12, and the roof 15 are configured as, for example, a part of a white body (unequipped vehicle body) of a vehicle by press-molding a metal panel such as a steel plate.

A seat 20 on which the occupant P is seated is provided inside the cabin 10.

The seat 20 is, for example, a passenger seat provided in a non-driver seat (passenger seat) in the foremost row in the cabin 10.

The seat 20 includes a seat cushion 21, a backrest 22, a headrest 23, and the like.

The seat cushion 21 is a part (seat surface part) on which the buttocks and thighs of the occupant P are placed.

The seat cushion 21 is attached to an upper part of the floor panel 11 via a seat rail (not illustrated) or the like.

The backrest 22 is a part that supports a back portion, a waist portion, a shoulder portion, and the like of the occupant P from the rear side.

The backrest 22 protrudes upward from the vicinity of a rear end of the seat cushion 21.

The headrest 23 is a part that supports the head of the occupant P from the rear side.

The headrest 23 protrudes upward from the vicinity of an upper end of the backrest 22.

At the time of collision of the vehicle, one or both of the passenger seat airbag 30 and the curtain airbag 40 are deployed in the cabin 10 in order to restrain the occupant P and suppress injury.

The passenger seat airbag 30 is a first bag that is deployed in front of the occupant P seated on the seat 20 and mainly restrains the occupant P from the front side.

The curtain airbag 40 is a second bag that expands laterally on the outside in the vehicle width direction of the occupant P seated on the seat 20 and prevents the head of the occupant P from directly colliding with the front side window or the pillar.

The passenger seat airbag 30 and the curtain airbag 40 are formed by, for example, stitching, fusing, or the like of base fabric panels made of a woven fabric such as nylon fibers into a bag shape.

As illustrated in FIG. 1, the rear portion of the passenger seat airbag 30 and the front portion of the curtain airbag 40 after deployment are disposed so as to overlap each other when viewed in the vehicle width direction.

In an undeployed state (non-collision state), the passenger seat airbag 30 is housed in a retainer (not illustrated) provided in the instrument panel 13 in a folded state.

In an undeployed state, the curtain airbag 40 is housed inside an interior member (trim) at a side portion of the roof 15 in a folded or rolled state.

Figure 2:
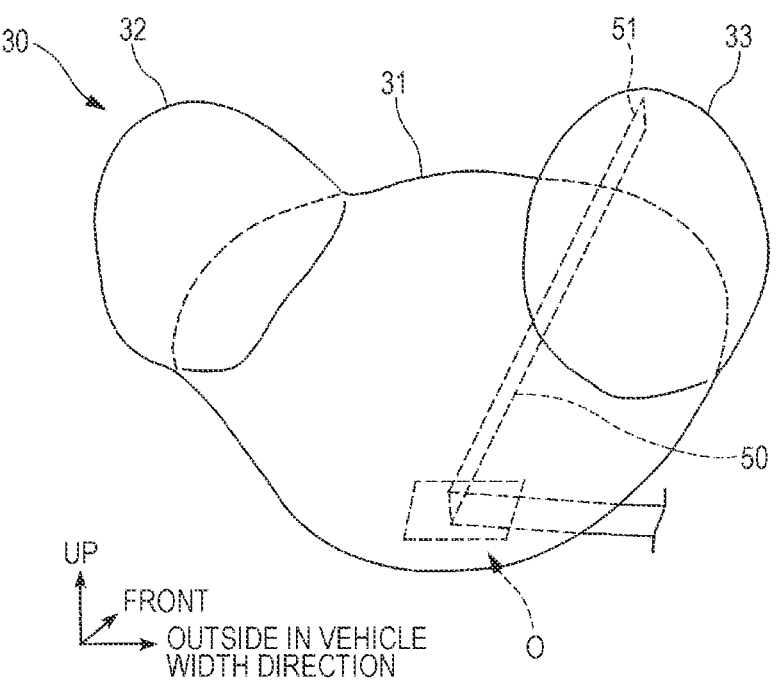
FIG. 2 is an external perspective view of a passenger seat airbag in the occupant protection device according to the embodiment.

FIG. 2 is an external perspective view of the passenger seat airbag in the occupant protection device according to the first embodiment.

FIG. 2 illustrates the passenger seat airbag 30 as viewed from the outside in the vehicle width direction and from an obliquely rear side.

The passenger seat airbag 30 includes a main bag 31, an inner support bag 32, an outer support bag 33, and the like.

The main bag 31 is a first air chamber that expands in a central portion when the passenger seat airbag 30 is viewed from the occupant P side.

A base end of the main bag 31 is coupled to a retainer provided on the instrument panel 13, and a deployment gas is supplied from an inflator that is a gas generator through an opening O.

The inner support bag 32 and the outer support bag 33 are second air chambers extending from the side portion of the main bag 31 to the vehicle rear side (occupant side) and obliquely outward.

The inner support bag 32 and the outer support bag 33 are side support portions having a function of holding and restraining the head, the upper body, and the like of the occupant P in the vehicle width direction and stabilizing the posture.

The inner support bag 32 and the outer support bag 33 communicate with the main bag 31, and the deployment gas is supplied through the inside of the main bag 31.

The inner support bag 32 is provided on the inner side in the vehicle width direction (the left side in a case of the left-hand drive vehicle illustrated in FIG. 2) with respect to the main bag 31.

The outer support bag 33 is provided on the outside in the vehicle width direction (the right side in the case of the left-hand drive vehicle illustrated in FIG. 2) with respect to the main bag 31.

When the passenger seat airbag 30 and the curtain airbag 40 are simultaneously deployed, the outer support bag 33 may interfere with the curtain airbag 40.

For example, it is assumed that the outer support bag 33 is pushed inward in the vehicle width direction by the curtain airbag 40.

Accordingly, in the present embodiment, a function of restricting the deployment of the outer support bag 33 when the curtain airbag 40 is deployed is provided by a tether 50 (deployment restriction member) described below.

The tether 50 is made of, for example, a woven fabric such as a nylon fiber, and is formed as a belt-shaped body (webbing belt) having flexibility.

As illustrated in FIG. 1 and the like, one end 51 of the tether 50 is coupled to an inner surface in the vicinity of a projecting end of the outer support bag 33 by, for example, stitching or the like.

The other end 52 of the tether 50 is coupled to an inner surface in the vicinity of a lower end when the curtain airbag 40 is deployed by, for example, stitching or the like.

A range from an intermediate portion to the end 52 of the tether 50 is drawn out to the outside of the passenger seat airbag 30 through the opening O, and is held in a movable state along a longitudinal direction of the tether 50 from a retainer of the instrument panel 13 to the inside of the curtain airbag 40 through the inside of a pillar trim (not illustrated) provided at a side end of the windshield 14 and the inside of a roof trim by using, for example, direction changing parts such as pulleys 53 and 54.

Figure 3:
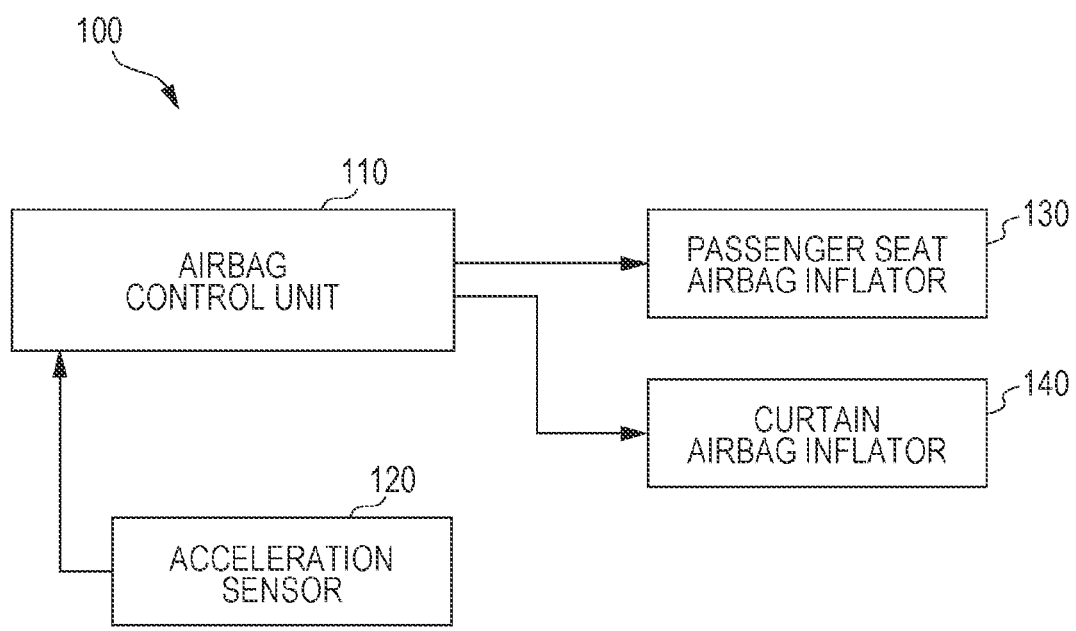
FIG. 3 is a diagram illustrating a system configuration for controlling the occupant protection device according to the embodiment.

FIG. 3 is a diagram illustrating a system configuration for controlling the occupant protection device according to the first embodiment.

A control system 100 of the occupant protection device includes an airbag control unit 110, an acceleration sensor 120, a passenger seat airbag inflator 130, a curtain airbag inflator 140, and the like.

The airbag control unit 110 is a control device that controls deployment of the passenger seat airbag 30 and the curtain airbag 40. In one embodiment, the airbag control unit 110 may serve as a "deployment controller".

The airbag control unit 110 can be configured as, for example, a microcomputer including an information processing unit such as a CPU, a storage unit such as a RAM and a ROM, an input/output interface, a bus coupling these, and the like.

The airbag control unit 110 is attached to, for example, an upper surface of the floor panel 11 or the like in the cabin 10.

The acceleration sensor 120 detects acceleration in the front-rear direction and the vehicle width direction acting on the vehicle body.

The acceleration sensor 120 can be provided in a housing of the airbag control unit 110 by permanently fixing to the airbag control unit 110, for example.

The airbag control unit 110 detects the occurrence of a collision and determines a collision form based on the output of the acceleration sensor 120.

The passenger seat airbag inflator 130 and the curtain airbag inflator 140 are chemical (gunpowder) gas generators that supply deployment gas to the passenger seat airbag 30 and the curtain airbag 40, respectively.

When the acceleration sensor 120 detects acceleration in a front-rear direction equal to or greater than a predetermined value, the airbag control unit 110 recognizes the occurrence of a frontal collision, and activates the passenger seat airbag inflator 130 to deploy the passenger seat airbag 30.

Further, when the acceleration sensor 120 detects a lateral acceleration equal to or greater than a predetermined value, the airbag control unit 110 activates the curtain airbag inflator 140 to deploy the curtain airbag 40.

Here, for example, in a case of an oblique frontal collision or the like in which another vehicle or the like collides with the vehicle from an oblique front side, the passenger seat airbag 30 and the curtain airbag 40 may be deployed together.

In the first embodiment, in order to prevent the outer support bag 33 of the passenger seat airbag 30 from interfering with the curtain airbag 40 and the passenger seat airbag 30 from being displaced inward in the vehicle width direction in such a case, deployment restriction of the outer support bag 33 is performed using the tether 50 as described below.

Figure 4:
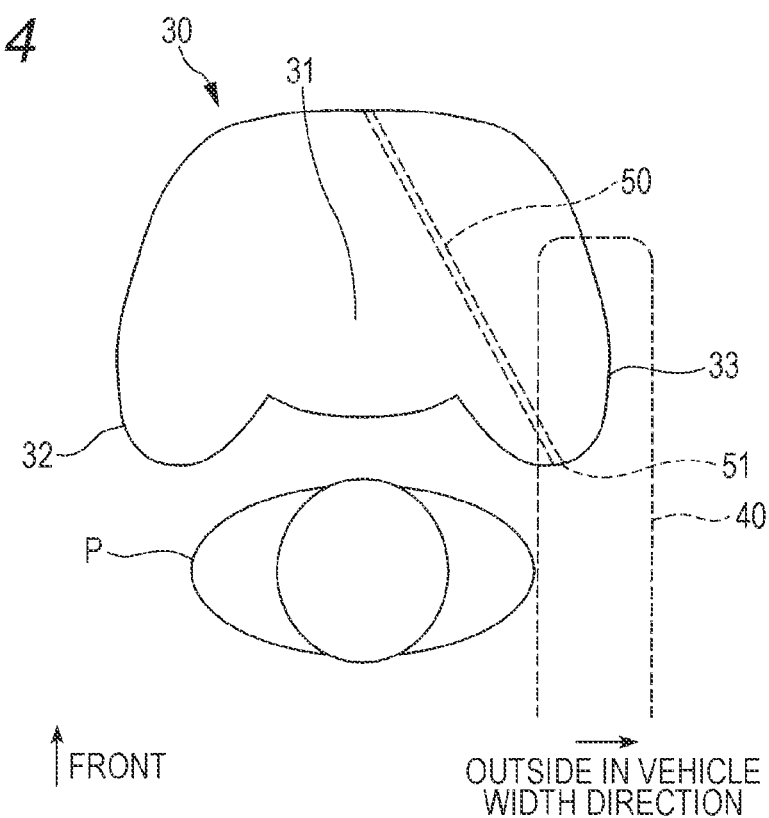
FIG. 4 is a schematic plan view illustrating a state when the passenger seat airbag is deployed in the occupant protection device according to the embodiment.

FIG. 4 is a schematic plan view illustrating a state when the passenger seat airbag is deployed in the occupant protection device according to the first embodiment.

FIG. 4 illustrates, for example, a normal state at the time of a frontal collision in which almost no behavior in the vehicle width direction occurs in the vehicle body.

In the state illustrated in FIG. 4, the curtain airbag 40 is not deployed, and the tethers 50 are relaxed and disabled.

Thus, the outer support bag 33 of the passenger seat airbag 30 is deployed without being subjected to the deployment restriction, and exhibits a function of holding the head and a right side portion of the upper body of the occupant P.

Figure 5:
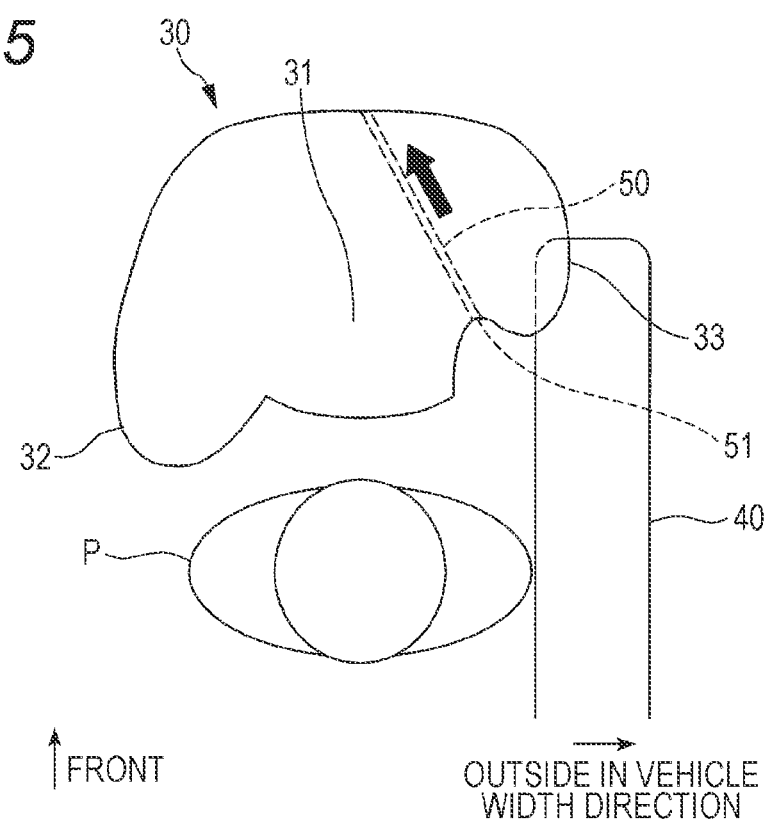
FIG. 5 is a schematic plan view illustrating a state when the passenger seat airbag and a curtain airbag are deployed in the occupant protection device according to the embodiment.

FIG. 5 is a schematic plan view illustrating a state when the passenger seat airbag and the curtain airbag are deployed in the occupant protection device according to the first embodiment.

As illustrated in FIG. 5, when both the passenger seat airbag 30 and the curtain airbag 40 are deployed, the end 52 of the tether 50 descends in accordance with the deployment of the curtain airbag 40, and pulls (enables) the tether 50.

Thus, as illustrated in FIG. 5, the end 51 of the tether 50 is drawn into the inside of the main bag 31 together with the projecting end of the outer support bag 33, and the outer support bag 33 is subjected to deployment restriction so that the amount of protrusion from the main bag 31 becomes small.

Thus, interference between the curtain airbag 40 and the outer support bag 33 is suppressed, and the passenger seat airbag 30 is suppressed from being displaced inward in the vehicle width direction by being pushed by the curtain airbag 40.

As described above, according to the first embodiment, the following effects can be obtained.

(1) In a case of a collision mode in which both the passenger seat airbag 30 and the curtain airbag 40 are deployed, by restricting the amount of protrusion of the outer support bag 33 protruding from the main bag 31 toward the curtain airbag 40 side from the passenger seat airbag 30, deformation and positional displacement of the passenger seat airbag 30 due to interference between the passenger seat airbag 30 and the curtain airbag 40 can be suppressed, and occupant protection performance can be improved by appropriately restraining the occupant P.

(2) Deployment of the outer support bag 33 is restricted by the tethers 50 passing through the inside of the main bag 31 and the outer support bag 33 of the passenger seat airbag 30 and having the end 51 joined to an inner surface of the outer support bag 33, whereby the deployment restriction member that does not hinder the deployment operation of the passenger seat airbag 30 can be configured with a simple configuration.

(3) One end of the tether 50 is coupled to a lower end when the curtain airbag 40 is deployed, and the tether 50 is configured to be pulled in conjunction with the deployment of the curtain airbag 40, so that the tether 50 is pulled in conjunction with the deployment of the curtain airbag 40, and it is not necessary to provide a dedicated actuator or the like for pulling the tether 50, whereby the device configuration can be simplified.

Second Embodiment

Next, a second embodiment of an occupant protection device to which the present disclosure is applied will be described.

In each embodiment to be described below, the same reference numerals are given to parts similar to those in the previous embodiment, the description thereof is omitted, and differences will be mainly described.

Figure 6:
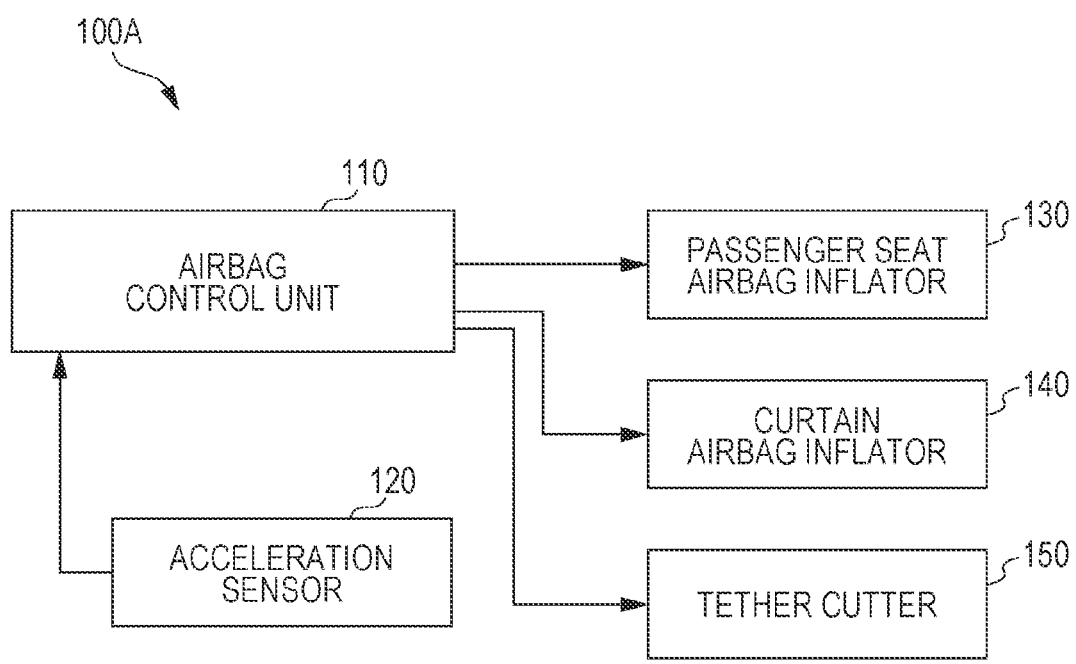
FIG. 6 is a diagram illustrating a system configuration for controlling an embodiment of an occupant protection device to which the present disclosure is applied.

FIG. 6 is a diagram illustrating a system configuration for controlling the occupant protection device according to the second embodiment.

A control system 100A according to the second embodiment further includes a tether cutter 150 in addition to the configuration of the control system 100 according to the first embodiment.

In the second embodiment, the end 52 of the tether 50 is coupled to the tether cutter 150.

The tether cutter 150 cuts off the end 52 of the tether 50 in response to a command from the airbag control unit 110, and disables the deployment restriction of the outer support bag 33 by the tether 50.

The airbag control unit 110 causes the tether cutter 150 to cut off the end 52 of the tether 50 when the passenger seat airbag 30 is deployed and the curtain airbag 40 is not deployed.

Thus, the outer support bag 33 of the passenger seat airbag 30 is deployed so as to protrude from the main bag 31 without being subjected to the deployment restriction.

Further, when both the passenger seat airbag 30 and the curtain airbag 40 are deployed, the airbag control unit 110 enables the tether 50 without activating the tether cutter 150.

Thus, the outer support bag 33 of the passenger seat airbag 30 is restricted from deploying similarly to FIG. 5 according to the first embodiment, and interference with the curtain airbag 40 is prevented.

Also in the second embodiment described above, effects similar to the effects according to the first embodiment described above (excluding the effects described in item (3)) can be obtained.

Third Embodiment

Next, a third embodiment of an occupant protection device to which the present disclosure is applied will be described.

Figure 7:
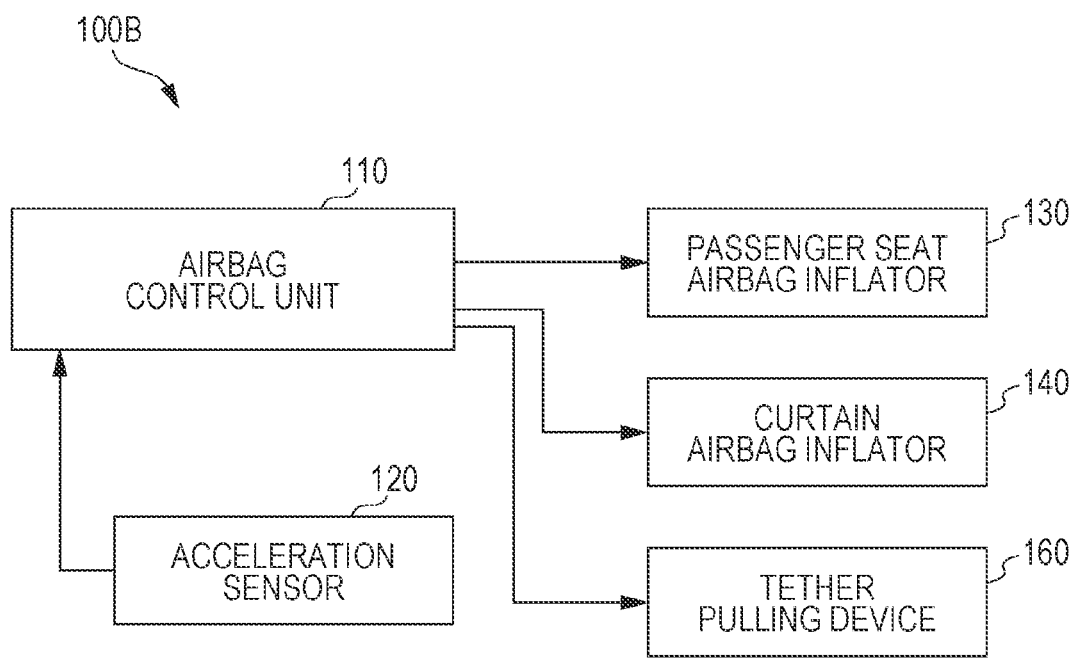
FIG. 7 is a diagram illustrating a system configuration for controlling an embodiment of an occupant protection device to which the present disclosure is applied.

FIG. 7 is a diagram illustrating a system configuration for controlling the occupant protection device according to the second embodiment.

A control system 100B according to the third embodiment further includes a tether pulling device 160 in addition to the configuration of the control system 100 according to the first embodiment.

In the third embodiment, the end 52 of the tether 50 is coupled to the tether pulling device 160.

The tether pulling device 160 has a function of winding up and pulling the tether 50 in response to a command from the airbag control unit 110 using an actuator such as a chemical (gunpowder) actuator, for example.

The airbag control unit 110 maintains the tether pulling device 160 in an inactive state when the passenger seat airbag 30 is deployed and the curtain airbag 40 is not deployed.

The tether 50 is relaxed and disabled in a state where the tether pulling device 160 is inactivated (not pulled), and does not restrict the deployment of the outer support bag 33.

Thus, the outer support bag 33 of the passenger seat airbag 30 is deployed so as to protrude from the main bag 31 without being subjected to the deployment restriction.

Further, when both the passenger seat airbag 30 and the curtain airbag 40 are deployed, the airbag control unit 110 activates the tether pulling device 160 and enables the tether 50.

Thus, the outer support bag 33 of the passenger seat airbag 30 is restricted from deploying similarly to FIG. 5 according to the first embodiment, and interference with the curtain airbag 40 is prevented.

Also in the third embodiment described above, effects similar to the effects according to the first embodiment described above (excluding the effect described in item (3)) can be obtained.

Modifications

The present disclosure is not limited to the embodiments described above, and various modifications and changes can be made, which are also within the technical scope of the present disclosure.

For example, the configuration of the occupant protection device is not limited to the configuration of each embodiment described above, and can be appropriately changed.

For example, although the deployment restriction member is provided in the passenger seat airbag in each embodiment, the present disclosure is not limited thereto, and the first bag may be provided in front of, for example, the driver seat or the passenger seat in the second and subsequent rows.

In addition, the second bag is not limited to the curtain airbag, and is not particularly limited to, for example, a side airbag or a first-side airbag that deploys inside in the vehicle width direction of the occupant.

An occupant protection device according to an aspect of the present disclosure includes a first bag configured to deploy in front of an occupant, a second bag configured to deploy adjacent to the first bag, and a deployment controller configured to select a first deployment mode in which the first bag deploys and the second bag does not deploy and a second deployment mode in which the first bag and the second bag deploy according to a collision mode, in which the first bag includes a first air chamber and a second air chamber protruding from the first air chamber toward the second bag, the occupant protection device further includes a deployment restriction member that restricts an amount of protrusion of the second air chamber from the first air chamber, and the deployment restriction member is disabled in the first deployment mode and enabled in the second deployment mode.

With this configuration, in a case of the collision mode in which the first bag and the second bag deploy together, by restricting the amount of protrusion of the second air chamber, which protrudes from the first bag toward the second bag side, from the first air chamber, deformation and positional displacement of the first bag due to interference between the first bag and the second bag can be suppressed, and occupant protection performance can be improved by appropriately restraining the occupant.

In the present disclosure, a configuration can be employed in which the second bag is a curtain bag configured to deploy in a region adjacent to a cabin side surface portion on a side of the first bag, and the second air chamber of the first bag is a side support portion that holds a side portion of a head or an upper body of the occupant.

With this configuration, by suppressing interference with the first bag when the second bag that is a curtain bag is deployed, it is possible to suppress displacement of the first bag inward in the vehicle width direction by being pushed by the curtain bag.

In the present disclosure, a configuration can be employed in which the deployment restriction member is a tether member that is inserted into the first air chamber and the second air chamber and has an end joined to an inner surface of the second air chamber.

With this configuration, with a simple configuration, it is possible to configure the deployment restriction member that does not hinder the deployment operation of the first bag.

In the present disclosure, a configuration can be employed in which one end of the tether member is coupled to a part of the second bag, and the tether member is pulled in conjunction with deployment of the second bag.

With this configuration, since the tether member is pulled in conjunction with the deployment of the second bag, it is not necessary to provide a dedicated actuator or the like for pulling the tether member, and the device configuration can be simplified.

In the present disclosure, a configuration can be employed in which there are further included a tether cutter configured to cut the tether member, and a tether cutter controller that actuates the tether cutter in the first deployment mode.

With this configuration, in the first deployment mode, the deployment of the second gas chamber of the first bag is not hindered by cutting the tether member, and in the second deployment mode, by maintaining the tether member in an effective state without cutting the tether member, the deployment of the second gas chamber can be restricted to suppress interference with the second bag.

As described above, according to the present disclosure, it is possible to provide an occupant protection device that prevents interference between bags and improves occupant protection performance.

The airbag control unit 110 illustrated in FIGS. 3, 6 and 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control unit 110 illustrated in FIGS. 3, 6 and 7. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control unit 110 illustrated in FIGS. 3, 6 and 7.

The invention claimed is:

1. An occupant protection device for a vehicle, the occupant protection device comprising:
    a first bag configured to deploy in front of an occupant of the vehicle;
    a second bag configured to deploy adjacent to the first bag; and
    a deployment controller configured to select a first deployment mode in which the first bag deploys and the second bag does not deploy or a second deployment mode in which the first bag and the second bag deploy according to a collision mode, wherein
    the first bag includes a first air chamber and a second air chamber protruding from the first air chamber toward the second bag,
    the occupant protection device further includes a deployment restriction member configured to restrict an amount of protrusion of the second air chamber from the first air chamber, and
    the deployment restriction member is configured to be disabled in the first deployment mode and enabled in the second deployment mode.

2. The occupant protection device according to claim 1, wherein
    the second bag is a curtain bag configured to deploy in a region adjacent to a side surface portion of a cabin of the vehicle on a side of the first bag, and
    the second air chamber of the first bag is a side support portion configured to hold a side portion of a head or an upper body of the occupant.

3. The occupant protection device according to claim 2, wherein
    the deployment restriction member is a tether member that is inserted into the first air chamber and the second air chamber and has an end joined to an inner surface of the second air chamber.

4. The occupant protection device according to claim 3, wherein
    one end of the tether member is coupled to a part of the second bag, and
    the tether member is configured to be pulled in conjunction with deployment of the second bap.

5. The occupant protection device according to claim 3, further comprising:
    a tether cutter configured to cut the tether member; and
    a tether cutter controller configured to actuate the tether cutter in the first deployment mode.

6. The occupant protection device according to claim 1, wherein
    the deployment restriction member is a tether member that is inserted into the first air chamber and the second air chamber and has an end joined to an inner surface of the second air chamber.

7. The occupant protection device according to claim 6, wherein
    one end of the tether member is coupled to a part of the second bag, and the tether member is configured to be pulled in conjunction with deployment of the second bag.

8. The occupant protection device according to claim 6, further comprising:
   a tether cutter configured to cut the tether member; and
   a tether cutter controller configured to actuate the tether cutter in the first deployment mode.

\* \* \* \* \*